United States Patent [19]

Dahmen et al.

[11] Patent Number: 5,686,555
[45] Date of Patent: Nov. 11, 1997

[54] ABSORBENTS FOR ACIDS AND LYES

[75] Inventors: Kurt Dahmen, Mönchengladbach; Reinmar Peppmöller, Krefeld; Uwe Günther, Tönisvorst, all of Germany

[73] Assignee: Chemische Fabrik Stockhausen GmbH, Krefeld, Germany

[21] Appl. No.: 419,056

[22] Filed: Apr. 7, 1995

[30] Foreign Application Priority Data

Apr. 11, 1994 [DE] Germany .......................... 44 12 153.9

[51] Int. Cl.$^6$ .......................... C08G 69/26; C08G 73/10; B01J 20/22

[52] U.S. Cl. .......................... 528/310; 528/271; 528/272; 528/274; 528/312; 528/322; 528/346; 528/422; 526/301; 526/309; 502/400; 502/401; 502/402

[58] Field of Search .......................... 526/301, 309; 502/400, 401, 402; 528/346, 274, 271, 272, 310, 322, 422, 312

[56] References Cited

U.S. PATENT DOCUMENTS

| | | | |
|---|---|---|---|
| 3,877,522 | 4/1975 | Knight et al. | 166/295 |
| 4,051,086 | 9/1977 | Reid | 525/154 |
| 4,076,673 | 2/1978 | Burkholder, Jr. | 524/389 |
| 4,111,922 | 9/1978 | Beede et al. | 526/292 |
| 4,190,562 | 2/1980 | Westerman | 526/238.23 |
| 4,734,478 | 3/1988 | Tsubakimoto et al. | 527/300 |
| 5,342,899 | 8/1994 | Graham et al. | 525/301 |

FOREIGN PATENT DOCUMENTS

| | | |
|---|---|---|
| 0 238 326 | 9/1982 | European Pat. Off. . |
| 0 188 963 | 7/1986 | European Pat. Off. . |
| 0 408 433 A1 | 1/1991 | European Pat. Off. . |
| J03-050209 | 3/1991 | Japan . |

*Primary Examiner*—Morton Foelak
*Assistant Examiner*—P. Hampton-Hightower
*Attorney, Agent, or Firm*—Oblon, Spivak, McClelland, Maier & Neustadt, P.C.

[57] ABSTRACT

The present invention relates to absorbents for aqueous acids or lyes comprising cross-linked, polycationic homopolymers and topolymers of quaternized, monoethylenically unsaturated carboxylic acid amino esters and/or carboxylic acid amides of the formula

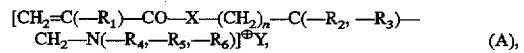

(A), wherein $R_1$ represents hydrogen or the methyl group, $R_2$ and $R_3$ represent hydrogen or the same or different alkyl groups having 1 to 4 C-atoms, $R_4$, $R_5$ and $R_6$ represent the same or different alkyl groups having 1 to 4 C-atoms, n stands for 0 or 1, X stands for —O— or —NH—, and Y represents an anionic acid residue.

5 Claims, No Drawings

ABSORBENTS FOR ACIDS AND LYES

BACKGROUND OF THE INVENTION

1. Field of the Invention

The present invention relates to absorbents for aqueous acids and lyes, which are based on cross-linked, preferably slightly cross-linked homopolymers and copolymers of quaternized, mono-ethylenically unsaturated carboxylic acid amino esters and carboxylic acid amides. The polymers are used as granulate or powder and may be employed alone, or in admixture with a conventional, porous, inorganic material, and together with non-wovens and fibrous materials. It is their task to bind quickly and completely highly caustic, aqueous solutions.

2. Description of the Related Art

So far, substances behaving substantially indifferent towards these aggressive media, for example, sand, kieselguhr, clay, and abauxite, have nearly exclusively been used as absorbing materials for acids and bases. They have a relatively low absorption capacity since this depends on the particle size and the surface per unit of weight. Polymer-based, synthetic, organic products of modified starch or cellulose, as described in the German published patent applications 26 14 662, 2712 043, 28 13 634, and 35 23 617 A1, have a high water absorption capacity, however, owing to the nature of their charge, they are absolutely unsatisfactory with respect to acids. Polymer products of partially neutralized acrylic acid and methacrylic acid behave in a similar way, these are described in a great variety of publications, in particular for hygiene and incontinence articles. Such absorbers are described, for example, in EP-A 0 513 780A1, 0 516 925 A1, and 0 530438 A1.

U.S. Pat. No. 4,111,922 describes particulate, solid copolymers of unsaturated, radically polymerizable, quaternary ammonium compounds and acrylic acid or acrylamide, as well as small amounts of a cross-linking agent. However, these are also only suitable for the absorption of water or urine. It is the same thing with a copolymer of acrylamidomethylpropane sulfonic acid, acrylic acid or acrylamide, and small amounts of a cross-linking agent, as described in EP-A 68 189.

Absorbing agents based on salt-like (cationic), ethylenically unsaturated monomers are described in the German published patent application no. 35 05 920 A1 wherein their high initial swelling rate towards artificial urine is pointed out. Indications as to a usability for the absorption of highly caustic acids and lyes cannot be found.

According to Japanese publication JP 89-185 634, resins having a high absorbency for strong acids can be obtained by copolymerizing acrylic esters or styrene with condensation products of acrylic acid or methacrylic acid and dimethylaminoalkanols or dimethylaminoalkylamines. These are copolymers which obtain a cationic nature not until after contact with an acid, e.g., when the acid-binding resins instead of the conventional acid-resistant non-wovens are used in sulfuric acid-containing lead accumulators. It is stated in this publication that a considerably longer service life of the electrodes is achieved by the pressure exerted on the battery plates.

SUMMARY OF THE INVENTION

It has been found that products which are capable of absorbing several times their own weight of strong acids or bases are obtained, after drying of the aqueous polymer gels, by radical polymerization of water-soluble, monoethylenically unsaturated, quaternary ammonium compounds of the general formula (A)

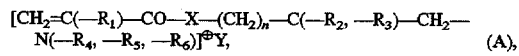

wherein $R_1$ represents hydrogen or the methyl group, $R_2$ and $R_3$ represent hydrogen or the same or different alkyl groups having 1 to 4 C-atoms, $R_4$, $R_5$ and $R_6$ represent the same or different alkyl groups having 1 to 4 C-atoms, n stands for 0 or 1, X stands for —O— or —NH—, and Y represents an anionic acid residue, such as monoalkyl sulfate, hydrogensulfate, or chloride, with small amounts of an at least doubly ethylenically unsaturated monomer, which has a cross-linking action, and optionally further non-ionic comonomers of the formulae (B) and/or (C),

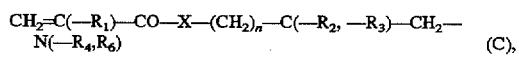

wherein $R_1$, $R_2$, $R_3$, $R_4$, $R_5$, $R_6$, and X have the meaning as in formula (A) and Z stands for —CO—N(—$R_1$,$R_2$), —CO—O—($CH_2$)$_n$—C(—$R_2$, —$R_3$)—$CH_2$—OH, or for —CN, up to a monomer portion of 70%-wt., relative to the total amount of monomers (A), (B), and (C).

DESCRIPTION OF THE PREFERRED EMBODIMENTS

Ethylenically unsaturated monomers of formula A may be: Dimethylaminoethyl acrylate quaternized with dimethyl sulfate or methyl chloride, dimethylaminopropyl acrylate, dimethylaminobutyl acrylate, diethylaminoethyl acrylate, diethylaminopropyl acrylate, diethylaminobutyl acrylate, dipropylaminoethyl acrylate, dipropylaminopropyl acrylate, dipropylaminobutyl acrylate, N-(1,1-dimethyl-3-dimethyloaminopropyl)acrylate, and the corresponding methacrylic esters, for example, dimethylaminoethyl methacrylate and dimethylaminopropyl methacrylate.

The same applies to the following substances:

Dimethylaminoethyl acrylamide quaternized with dimethyl sulfate or methyl chloride, dimethylaminopropyl acrylamide, dimethylaminobutyl acrylamide, diethylaminoethyl acrylamide, diethylaminopropyl acrylamide, diethylaminobutyl acrylamide, dipropylaminoethyl acrylamide, dipropylaminopropyl acrylamide, dipropylaminobutyl acrylamide, N-(1,1-dimethyl-3-dimethyloaminopropyl)-acrylamide, and the methacrylamide derivatives, such as dimethylaminoethyl methacrylamide and dimethylaminopropyl methacrylamide.

The following substances fall under the monomers of formula B: Acrylamide, methacrylamide, mono- and dialkyl-($C_1$-$C_4$)-acrylamide or methacrylamide, monoacrylic esters and monomethacrylic esters of polyhydroxy compounds, such as 2-hydroxyethyl-(meth-) acrylate, 3-hydroxypropyl-(meth-) acrylate, 2-hydroxypropyl-(meth-)acrylate, hydroxybutyl-(meth-)acrylate, diethyleneglycol mono-(meth-)acrylate, and acrylonitrile.

The following substances belong to the monomers of formula C: Dimethylaminoethyl acrylate, dimethylaminopropyl acrylate, dimethylaminobutyl acrylate, diethylaminoethyl acrylate, diethylaminopropyl acrylate, diethylaminobutyl acrylate, dipropylaminoethyl acrylate, dipropylaminopropyl acrylate, dipropylaminobutyl acrylate, N-(1,1,-dimethyl-3-dimethyloaminopropyl)acrylate and the corresponding methacrylic esters, such as dimethylaminoethyl methacrylate and dimethylaminopropyl methacrylate. Additional examples include: dimethylaminoethyl acrylamide, dimethylaminopropyl acrylamide, dimethylaminobutyl acrylamide, diethylaminoethyl acrylamide, diethylaminopropyl acrylamide, diethylaminobutyl acrylamide, dipropylaminoethyl acrylamide, dipropylaminopropyl acrylamide, dipropylaminobutyl acrylamide, N-(1,1-dimethyl-3-dimethylaminopropyl)acrylamide, and the methacrylamide derivatives, for example, dimethylaminoethyl methacrylamide and dimethylaminopropyl methacrylamide.

Polyfunctional, cross-linking monomers having at least two ethylenically unsaturated groups which are polymerizable with quaternary ammonium salts and should suitably be partially water-soluble are derived from acrylic esters and methacrylic esters, from allyl and vinyl esters.

The amount of the cross-linking agent amounts to 0.01–5%-wt., preferably 0.1–2%-wt., most preferably 0.2–1%-wt., relative to the total amount of the monomers (A), (B), and (C).

Examples thereof include:

polyacrylic esters and polymethacrylic esters of polyols; polyallyl amines, polyallyl ethers; polyacrylamide and polymethacrylamide compounds; as well as divinyl compounds. Specific examples from these substance groups are N,N'-methylenebisacrylamide, N,N'-methylenebismethacrylamide, triallyl amine, tetraallyl ammonium chloride, trimethylolpropane triacrylate, glycerol propoxytriacrylate, divinylbenzene, and tetraallyl oxiethane.

The production of the acid- and lye-absorbing products according to the present invention is carried out by radically initiated polymerization in aqueous solution. The monomer of formula A is reacted, optionally with the monomer of formula B or C, together with the cross-linking agent, which exhibits more than one ethylenically unsaturated group, in aqueous solution by means of radical-forming substances, such as hydrogen peroxide and sodium sulfite, or by means of ultraviolet light. After initiation, the temperature of the monomer mixture starts to rise up to a maximum, in accordance with the molar polymerization heat and the thermal capacity of the system, and gradually falls again. Subsequently, the thoroughly polymerized, solid get block is comminuted, dried and ground. Finally, screening and classification according to particle size is effected. It is preferred that the drying take place at temperatures of 120°–160° C.

In the presence of water the cross-linked, polyquaternary resins absorb acids, such as sulfuric acid, hydrochloric acid, nitric acid, phosphoric acid, and hydrofluoric acid, but also organic acids, such as formic acid, acetic acid, propionic acid, acrylic acid, crotonic acid, and alkylsulfonic acids, under formation of a gel. In this connection, they swell up to a multiple of their own volume. On the other hand, strong and weak aqueous lyes, such as sodium hydroxide solution, potassium hydroxide solution, ammonium solution, and amine solutions are also absorbed and converted into a solid form. The property of the polymer products according to the present invention to absorb sulfuric acid under swelling also permits a use in lead accumulators, provided that the quaternization of the monomer has been conducted with dimethyl sulfate.

After drying, the polycationic resins are generally brought to a particle size spectrum of 50 to 5,000 μm, in particular 100 to 2,000 μm, by means of grinding and screening, and they are used in the form of a powder. However, it may also be advantageous to bind the absorbing, powdery resin into plastic non-wovens, thus protecting them from spilling and scattering. Additionally, mixtures with easily available and inexpensive inerts, such as sand, kieselguhr, plastic fibers, and comminuted plastic waste, can be produced prior to or after polymerization.

The following abbreviations are used in the Examples hereunder:

DIMAPA-quat: solution of dimethylaminopropyl acrylamide quaternized with $CH_3Cl$ (60%-wt.), DIMAPA: dimethylaminopropyl acrylamide, ADAME: acrylic acid dimethylaminoethanol ester, AcA: 40%-wt. solution of acrylamide, MBAA: N,N'-omethylenebisacrylamide, ABAH: azo-bis(2-amidinopropane)-dihydrochloride, BHP: t-butyl hydroperoxide.

EXAMPLE 1

100 parts of DIMAPA-quat. and 56 parts of AcA are added to 45 parts of water and adjusted to a pH of about 4.5 with hydrochloric acid. Then 0.21 parts of MBAA are added. After 1 hour of vigorously purging the monomer solution with nitrogen, the polymerization is started at room temperature by means of 0.03 parts of BHP and 3.2 parts of sodium disulfite. After the initiation phase, the temperature begins to rise and reaches about 70° C. at the end of the polymerization. Afterwards, the gel is dried at 150° C. and then ground (Retsch-mill, type ZM 1). The obtained powder is placed on a screening machine, and the particles of less than 100 pm and more than 2,000 μm, respectively, are separated.

EXAMPLE 2

50 parts of DIMAPA-quat., 22.7 parts of DIMAPA, and 56 parts of AcA are placed into 65 parts of water and adjusted to a pH of about 4.5 by means of sulfuric acid. 0.21 parts of MBAA are added then. After 1 hour of vigorously purging the monomer solution with nitrogen, the polymerization is started at room temperature by means of 0.03 parts of BHP and 3.2 parts of sodium disulfite. After the initiation phase, the temperature begins to rise and reaches about 70° C. at the end of the polymerization. Afterwards, the gel is dried at 150° C. and then ground and screened (100–2,000 μm).

EXAMPLE 3

In accordance with Example 1; except that 30 parts of DIMAPA-quat., 32 parts of ADAME, and 10 parts of hydroxyethyl acrylate are placed in 45 parts of water and adjusted to a pH of about 4.5 by means of sulfuric acid. Further processing is carried out as described above.

Examinations with respect to application technology:

The following Table shows typical absorption values (w/w) for products of Examples 1–3 with liquids of different acid and lye contents.

| Example | 1 | 2 | 3 |
|---|---|---|---|
| hydrochloric acid, conc. | 27 | 26 | 26 |
| sulfuric acid, 35% | 28 | 27 | 25 |
| nitric acid, conc. | 49 | 43 | 41 |
| acetic acid, 70% | 69 | 68 | 66 |
| phosphoric acid, 50% | 31 | 31 | 29 |
| sodium hydroxide solution, 25% | 30 | 29 | 29 |
| solution of sodium chloride (0.9%) | 32 | 32 | 30 |
| ammonia, 25% | 33 | 32 | 31 |

We claim:

1. A method for absorbing strong aqueous acids or lyes comprising the steps of:

a) contacting strong aqueous acids or lyes with an absorbent; and b) allowing the absorbents to absorb the strong aqueous acids or lyes, wherein said absorbent comprises cross-linked, polycationic homopolymers, copolymers, or homopolymers and copolymers of particle size 50 to 5,000 µm, which have been produced by radically initiated polymerization in aqueous solution, said polycationic homopolymers and copolymers being of quaternized, monoethylenically unsaturated carboxylic acid amino esters and/or carboxylic acid amides of the formula

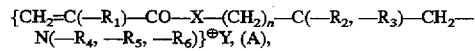

wherein:

$R_1$ represents hydrogen or a methyl group, $R_2$ and $R_3$ represent hydrogen or the same or different alkyl groups having 1 to 4 C-atoms, $R_4$, $R_5$ and $R_6$ represent the same or different alkyl groups having 1 to 4 C-atoms, n stands for 0 or 1, X stands for —O— or —NH—, and Y represents an anionic acid residue, wherein the copolymers comprise up to 70%-wt. of nonionic monomers of the formulae (B) and/or (C), based on the total amount of monomers A+B+C

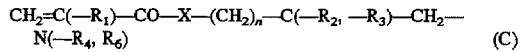

wherein $R_1$, $R_2$, $R_3$, $R_4$, $R_5$, $R_6$, and X have the meaning as in formula (A) and Z stands for —CO—N(—$R_1$, $R_2$), —CO—O—($CH_2$)$_n$—C(—$R_2$, —$R_3$)—$CH_2$—OH, or for —CN, these monomers being incorporated by polymerization.

2. The method of claim 1 wherein the absorbents are of particle size 100 to 2,000 µm.

3. The method of claim 1 wherein Y represents monoalkyl sulfate, hydrogensulfate, or chloride.

4. The method of claim 1, wherein the strong aqueous acid is selected from the group consisting of sulfuric acid, hydrochloric acid, nitric acid, phosphoric acid, and hydrofluoric acid.

5. The method of claim 1, wherein the strong aqueous lye is selected from the group consisting of sodium hydroxide, potassium hydroxide, and ammonium hydroxide.

* * * * *